United States Patent
Mehta et al.

(10) Patent No.: US 12,287,803 B2
(45) Date of Patent: Apr. 29, 2025

(54) TECHNIQUES FOR GENERATING CUSTOMER PROFILES IN A DATA WAREHOUSE

(71) Applicant: Twilio Inc., San Francisco, CA (US)

(72) Inventors: Udit Mehta, San Francisco, CA (US); Thomas Pelletier, San Francisco, CA (US); Max Luster, San Francisco, CA (US); Brooks Taylor, San Francisco, CA (US); Hanhan Wang, Seattle, WA (US); Ranjith Govindan, San Francisco, CA (US); Rakesh Nair, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 17/971,329

(22) Filed: Oct. 21, 2022

(65) Prior Publication Data
US 2024/0134873 A1 Apr. 25, 2024
US 2024/0232212 A9 Jul. 11, 2024

(51) Int. Cl.
*G06F 16/25* (2019.01)
*G06F 16/22* (2019.01)

(52) U.S. Cl.
CPC ........ *G06F 16/254* (2019.01); *G06F 16/2282* (2019.01)

(58) Field of Classification Search
CPC ............................ G06F 16/254; G06F 16/2282
See application file for complete search history.

(56) References Cited

U.S. PATENT DOCUMENTS

| | | | |
|---|---|---|---|
| 8,812,752 B1* | 8/2014 | Shih ....................... | G06F 9/542 717/109 |
| 9,516,053 B1* | 12/2016 | Muddu ................. | G06F 3/0484 |
| 11,429,697 B2 | 8/2022 | Poirel et al. | |
| 2013/0275363 A1* | 10/2013 | Wu ........................... | G06F 9/46 707/602 |
| 2015/0100515 A1* | 4/2015 | George ................ | G06Q 10/067 705/342 |
| 2021/0149854 A1* | 5/2021 | Barde ..................... | H04L 63/08 |
| 2021/0390119 A1* | 12/2021 | McNamara ........... | G06F 16/278 |
| 2022/0100720 A1 | 3/2022 | Dhama et al. | |
| 2022/0101161 A1* | 3/2022 | Goel ....................... | G06N 20/00 |
| 2022/0292525 A1 | 9/2022 | Ash et al. | |

OTHER PUBLICATIONS

Stanhope J, Pilecki M, Khatibloo F, Moffett T, Chien A, Glazer L. The strategic role of identity resolution. Identity Is Context In The Age of The Customer. Forrester. Oct. 17, 2016. (Year: 2016).*

(Continued)

*Primary Examiner* — Mohsen Almani
(74) *Attorney, Agent, or Firm* — Schwegman Lundberg & Woessner, P.A.

(57) ABSTRACT

A data warehouse connector service is described. The data warehouse connector service integrates with an identity resolution system of a customer data platform to systematically communicate identity-resolved customer profile data from the customer data platform to a cloud-based data warehouse. Operation of the data warehouse connector is managed through various configuration settings accessible to an end-user of the customer data platform via a user interface.

18 Claims, 7 Drawing Sheets

(56) References Cited

OTHER PUBLICATIONS

Bellahsene Z. Schema evolution in data warehouses. Knowledge and Information Systems. Jul. 2002;4:283-304. (Year: 2002).*
El Beggar, Omar, Khadija Letrache, and Mohammed Ramdani. "DAREF: MDA framework for modelling data warehouse requirements and deducing the multidimensional schema." Requirements Engineering 26.2 (2021): 143-165. (Year: 2021).*
Roth, Heinz, et al. "Event data warehousing for complex event processing." 2010 Fourth International Conference on Research Challenges in Information Science (RCIS). IEEE, 2010. (Year: 2010).*
Nicholson Jr, Delmer William. Using Model Generation for Data Warehouse Conceptual to Physical Schema Mapping. MS thesis. University of Cincinnati, 2008. (Year: 2008).*
"International Application Serial No. PCT US2023 077408, International Search Report mailed Jan. 22, 2024", 3 pgs.
"International Application Serial No. PCT US2023 077408, Written Opinion mailed Jan. 22, 2024", 8 pgs.

* cited by examiner

TECHNIQUES FOR GENERATING CUSTOMER PROFILES IN A DATA WAREHOUSE

TECHNICAL FIELD

The present application generally relates to a data service and data processing pipeline, integrated with a customer data platform, for automating the transfer of identity-resolved customer profile data to a cloud-based data warehouse.

BACKGROUND

The modern enterprise relies on the effective collection, storage, and integration of data from disparate data sources for generating analysis and insights. These data analytics activities have moved to the heart of revenue generation, cost containment, and profit optimization. As a result, the amounts of data that any enterprise is generating and analyzing, as well as the number and types of data sources, is rapidly increasing. Data-driven enterprises require robust solutions for managing and analyzing large quantities of data across their organizations. These systems must be scalable, reliable, and secure enough for regulated industries, as well as flexible enough to support a wide variety of data types and use cases. The requirements go beyond the capabilities of traditional database systems. Today, data warehouses are the preferred storage system for such applications.

A data warehouse is an enterprise system used for the analysis and reporting of structured and semi-structured data from multiple sources, such as point-of-sale transactions, marketing automation, customer relationship management, and more. A data warehouse is suited for ad hoc analysis, for example, such as processing one-off queries, but also suited for sophisticated data reporting that relies on integrated machine learning-based business intelligence systems. A data warehouse can store both current and historical data in one place and is designed to give a long-range view of data over time, making it a primary component of business intelligence applications. However, before data in a data warehouse can be leveraged for the benefit of the enterprise, the data must be written to and stored in the data warehouse. In many situations, this can be technically challenging.

BRIEF DESCRIPTION OF THE DRAWINGS

Embodiments of the present invention are illustrated by way of example and not limitation in the figures of the accompanying drawings, in which.

DETAILED DESCRIPTION

Figure 1:
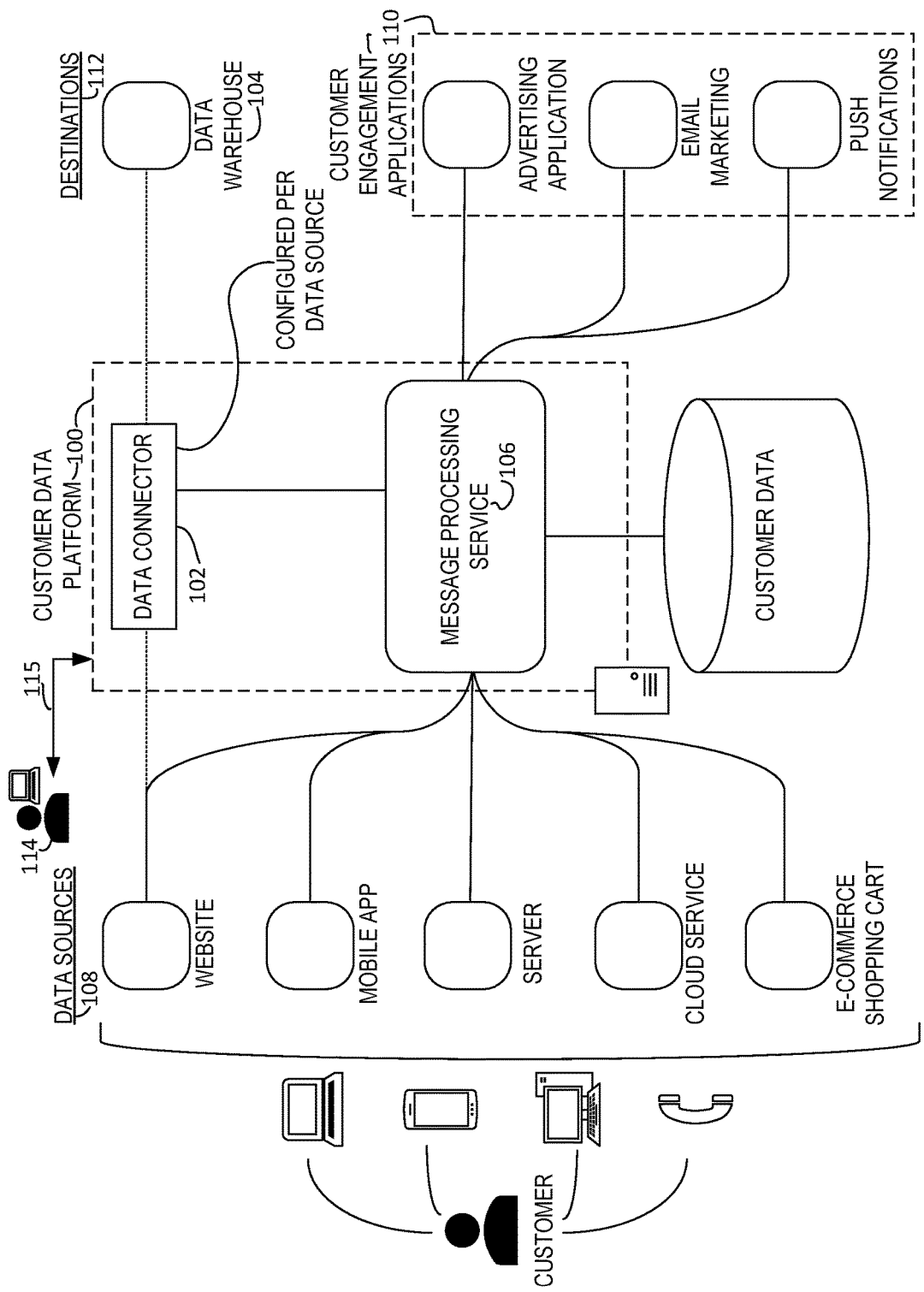
FIG. 1 is a diagram illustrating a high-level view of a customer data platform providing a conventional data connector configured for a specific data source.

Described herein are systems and methods for writing identity-resolved, customer profile data from a customer data platform to a cloud-based data warehouse. More specifically, described herein is a data service, referred to as a data warehouse connector, that is integrated with an identity resolution system of a customer data platform. The data warehouse connector facilitates the automated transfer of customer profile data received from the identity-resolved customer profile data to a cloud-based data warehouse. In the following description, for purposes of explanation, numerous specific details and features are set forth in order to provide a thorough understanding of the various aspects of different embodiments of the present invention. It will be evident, however, to one skilled in the art, that the present invention may be practiced and/or implemented with varying combinations of the many details and features presented herein.

Data warehouses are the data storage system of choice for advanced business analytics and reporting. Data warehouses provide a single storage space for aggregating large amounts of data—both current data and historical data—from a variety of disparate data sources. By bringing data together from multiple data sources, advanced data analytics applications and reporting tools can be used to process large amounts of related data for purposes of making accurate business-related predictions and generating useful data-driven insights, and so on.

When it comes to business analytics, one of the most important types of data is customer data, and one of the best sources of customer data is a customer data platform ("CDP"). A customer data platform is a software-based system that creates a persistent, unified customer database that is accessible to a variety of applications and software-based systems. Customer data is obtained from a variety of data sources (e.g., customer touch points). The customer data is then processed to "clean" the data, and then the customer data is combined with previously obtained customer data, to create for each customer a customer profile.

It should be noted that in the context of a customer data platform, a "customer profile," is different than a "user profile" or "end-user profile," as those terms tend to be used in the context of a typical online application or service. Specifically, the terms "user profile" and "end-user profile" are frequently used to describe some limited collection of biographical data that can be used to describe and or uniquely identify an end-user of an online application or service, at a specific point in time—that is, the present or current time. For instance, a user profile, in the context of an online application or service, may include data indicating a person's canonical name (e.g., John Smith), mailing address, residential and/or office address, phone number, and so forth. If a user of an online application or service updates a portion of his or her "user profile" (e.g., as a result of moving from one residential location to another, or obtaining a new phone number), the new information replaces the old information such that the old information will no longer be part of the user's profile and will typically no longer be accessible. In contrast, in the context of a customer data platform, the customer data that is part of a customer profile is far more encompassing and tends to include all data—including raw data—relating to an individual customer over a longer duration of time, including historical and current data. Accordingly, if a customer updates his or her email address, the customer data indicating the customer's old email address is not updated such that the new email address replaces the old email address, but instead, the new email address is added to the customer profile.

As described in greater detail below, much of the customer data arrives at the customer data platform via messages that result from various interactions by customers with different data sources. Each message may be associated with an event, where the event type corresponds with a specific API call or request from which the message was generated. The nature of the customer profile data may vary from one data source to the next, but is generally described and referred to herein as event data. Some messages or events may be system defined, such that the data and format of each message is known in advance. In other instances, the event and event data that results from a message may be customized for a specific application. By way of example, the event data that may be included in a customer profile may include, but is certainly not limited to:

Customer event data: web browsing activity, actions on a website or in an app, click data, and so forth.

Transactional data: data relating to purchases, returns, data from a point-of-sale terminal, or e-commerce shopping cart.

Customer attributes: age, gender, birthday, date of first purchase, segmentation data, customer prediction data.

Campaign evaluation data: impressions, clicks, reach, engagement, emails opened or viewed, etc.

Customer-company history: data from interactions with customer service, Net Promoter Scores (NPS), data from chatbots, social media posts, survey verbatims, focus group transcripts, call center audio files, etc.

The above categories of customer data are provided as examples and to generally convey an understanding of the overall innovative subject matter. It will be readily appreciated that with various implementations of different customer data platforms, the nature of the customer data may differ from one implementation to the next, and the customer data may be categorized and/or referenced differently.

While customer data from a customer data platform is an extremely important category of data that can be leveraged by different business analytics and reporting applications and tools, one of the primary technical challenges that must be overcome before such customer data is useful is getting the customer data into a data warehouse in the first place. For instance, with many customer data platforms, a data analyst affiliated with an enterprise or organization that is using a customer data platform to generate customer data may experience data lock-in. Data lock-in occurs when customer data is "locked in" to a particular product or service, making it difficult and expensive, if not outright impossible, to export the data to other platforms and systems. Some of the many technical difficulties and problems that arise in the context of getting relevant customer data into a cloud-based data warehouse are presented below, in connection with the descriptions of FIGS. 1 and 2.

FIG. 1 is a diagram illustrating a high-level view of a customer data platform 100 providing a conventional data connector 102 configured to obtain data from one specific data source and write the data to a cloud-based data warehouse 104. In general, the customer data platform 100 operates by receiving at a message processing service 106 messages from any of a wide variety of data sources 108. The message processing service 106 processes the event data included within the received messages to verify the event data, and translates the event data into formats suitable for consumption by various applications 110. The message processing service 106 then selectively routes the formatted event data to any of a number of destinations 112, including the various applications 110. The data sources 108 may include, for example, websites, applications (e.g., desktop and/or mobile applications), servers and server-based resources, cloud-based services, transaction data generated via e-commerce shopping carts, API-based telephony services, and many others. Typically, the entity that owns and operates the customer data platform 100 will make one or more software libraries with various application programming interface ("API") calls available, so that each data source 108 can be easily customized and configured to generate messages with relevant event data. These messages are communicated as API messages to the message processing service 106 (which may include an API server) of the customer data platform 100, when customers interact with one of the data sources 108.

In many cases, a customer data platform 100 is offered via a Platform-as-a-Service ("PaaS") model, a Software-as-a-Service ("SaaS") model, or as an Infrastructure-as-a-Service ("IaaS") model. Accordingly, a customer of the entity that offers the customer data platform as a service will configure the customer data platform and various data sources and destinations to be interoperable. For purposes of the present disclosure, the term "end-user" will be used in reference to a customer of the entity operating the customer data platform, whereas the term "customer" will be used in reference to users who interact with the data sources managed by the organization that is a customer of the customer data platform. In any case, an end-user 114 (e.g., a representative of an organization on whose behalf customer data is being collected by the customer data platform 100) will access 115 the customer data platform 100 via one or more user interfaces to configure the customer data platform 100 to operate with various data sources 108 and destinations 112. In many instances, the data sources 108 will include computing resources managed by the organization, or by third-parties, different from the entity that owns and operates the customer data platform. By way of example, to integrate a website for operation with the customer data platform, one or more scripts (e.g., JavaScript) may be injected into the source code of the individual web pages. Based on various configuration settings established by the representative 114 of the organization, the message processing service 106 will receive and process messages from specific, pre-configured data sources, and selectively route data to, pre-configured destinations 112, consistent with the configuration settings established by the representative 114.

With some customer data platforms 100, one of the destinations that can be configured to receive data is a data warehouse 104. By way of example, the data connector 102 shown in FIG. 1 is an example of a data service integrated with the customer data platform 100, and which can be configured on a per data source basis, to write data received from the data source to the data warehouse 104. For instance, in the example shown in FIG. 1, the data connector 102 has been configured to obtain customer data (e.g., event data) from a website, and then write the data to the data warehouse 104. Accordingly, in the example shown in FIG. 1, only event data obtained from messages received from the website 108 are written to the data warehouse 104, as the data connector is configured per data source. This can be problematic as the event data that is written to the data warehouse may not have any data by which the specific customer can be identified. Consequently, it may be difficult, if not impossible, to associate the event data that is communicated and written to the data warehouse with a specific customer. The result is that the data in the data warehouse does not provide a complete view of any one customer. Consequently, various data analytics tasks, such as customer attribution—where successful outcomes (e.g., purchase transactions, event registrations, etc.) are shown to be attributable to certain, or certain combinations of, customer touchpoints—cannot be achieved. Here, the touchpoints are the data sources at which a customer interaction caused an event that resulted in the creating of a message in the first place. This and other problems are described below, and specifically in connection with the description of FIG. 2.

Figure 2:
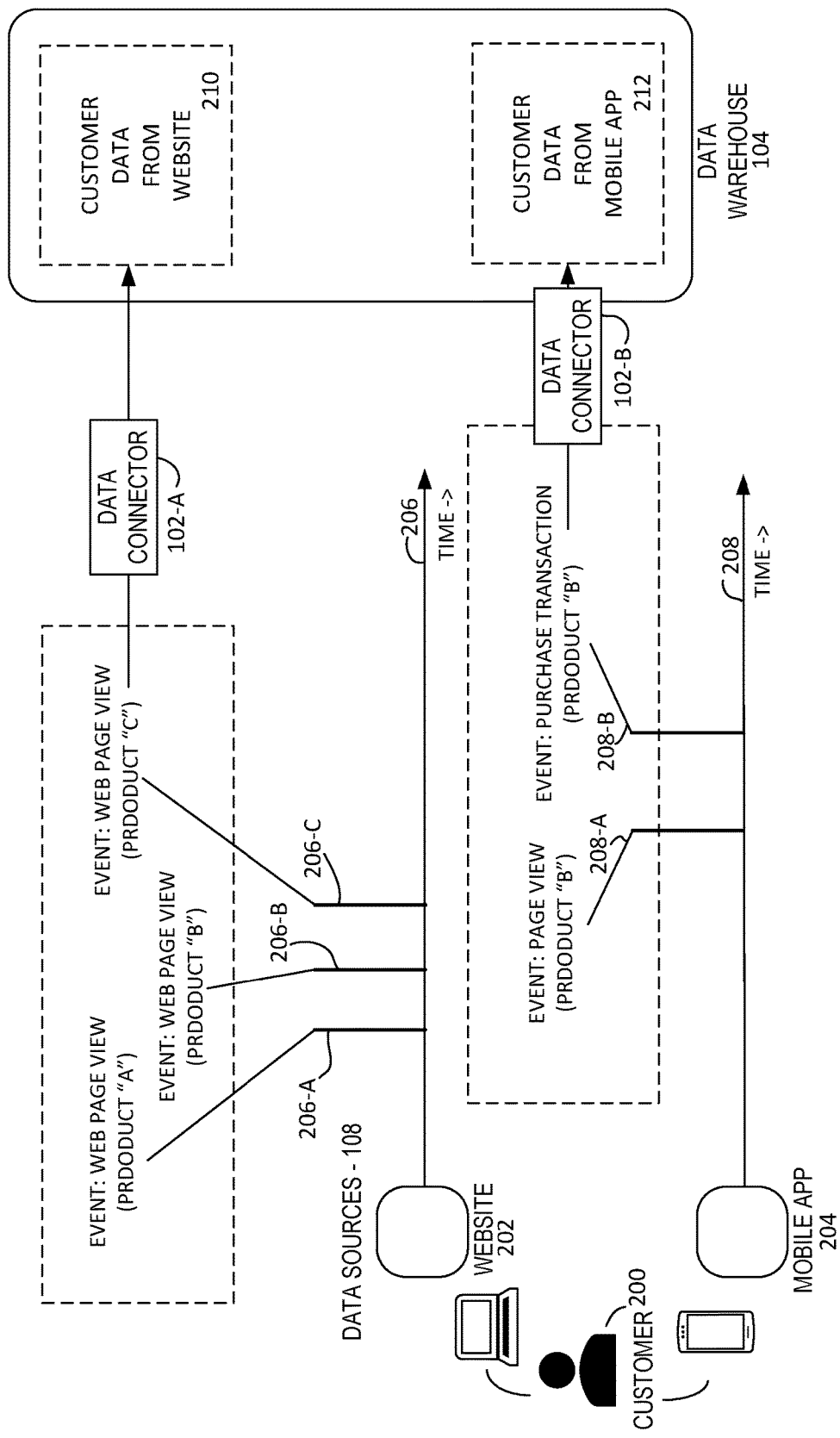
FIG. 2 is a diagram illustrating an example of some of the problems that arise with the conventional data connector illustrated in FIG. 1.

FIG. 2 is a diagram illustrating an example of some of the deficiencies with conventional data connectors, such as that described and illustrated in connection with FIG. 1. The diagram shown in FIG. 2 illustrates an example of a single customer 100 interacting with two separate data sources—for example, a website 202, and a mobile application 204—over two different sessions (e.g., at two different times). For instance, in this example, the horizontal lines with reference numbers 206 and 208 are timelines, representing the passage of time. The customer 200 has a first set of interactions with the website 202 at a first time, which results in three messages 206-A, 206-B, and 206-C being generated and communicated to the customer data platform, and ultimately via the data connector 102-A to the data warehouse 104. A first message 206-A relates to an event involving a webpage view relating to a product referred to here as product "A." A second message 206-B is generated moments later as a result of the customer 200 having a second interaction with a webpage, in this case viewing product "B." Finally, a third message 206-C with event data is generated as a result of the customer 200 interacting with another webpage and viewing product "C." When a data connector 102-A is configured on a per data source basis (e.g., for the website 202), all of the event data that is included with the various messages (206-A, 206-B and 206-C) that are generated as a result of the customer's interaction with the website 202 will be written to the data warehouse 104 and stored in one or more tables. This is illustrated in FIG. 2 by the dashed bounding box with reference number 210.

For purposes of this example, at some point later in time, the same customer 200 interacts with a mobile application 204 that is configured via the customer data platform as a data source. Here, an interaction by the customer 200 with the mobile application 204 results in a series of messages 208-A and 208-B being communicated to the customer data platform, where the event data in the first message relates to a page view for the product referred to as product "B." Moments later, as evidenced by the message 208-B, the customer 200 concludes a purchase transaction for product "B." In this example, presuming that a second data connector 102-B has been configured for the mobile app 204, all of the event data included with messages resulting from the customer's interactions with the mobile application 204 will be written to the data warehouse 104, as shown with reference number 212.

Using a data connector configured on a per data source basis, as shown in FIGS. 1 and 2, results in an incomplete view of the customer data. For example, the event data resulting from messages associated with different interactions taken by the same customer cannot easily be joined (e.g., by query), once written to the data warehouse 104. This makes it difficult, if not impossible, to perform advanced analytics as the essential data that links the event data of the same customer is missing. For instance, in the example of FIG. 2, because the event data resulting from the customer's interactions with the mobile application 204 cannot easily be associated with the event data resulting from the customer's interactions with the website 202, it would be nearly impossible to attribute any of the customer's initial interactions with the website 202 as being influential in the customer's decision to conclude a purchase transaction for product "B."

Consistent with embodiments of the present invention, a data warehouse connector is integrated with an identity resolution system or module of a customer data platform. As messages are received by the customer data platform, the identity resolution system analyzes the event data included with the messages to resolve the identity of the messages, resulting in what is referred to herein as identity-resolved messages or identified messages. Every identity-resolved message is associated with a unique, system-generated identifier, referred to herein as a segment identifier ("ID"), or segment ID. Accordingly, for each message received, the relevant event data extracted from the message is associated with a segment ID written to an event table in a data warehouse, where the event table is specific to the event type that corresponds with the API call from which the message was generated. Because the segment ID is stored in association with the event data, regardless of the event type and data source, the segment ID can be used to join event data common to a single customer.

In addition to being associated with event data, the segment ID is also associated with data that identifies a specific customer. This type of data is referred to herein as an external ID. Each message received by the customer data platform may include an external ID. Each external ID has an external ID type, and an external ID value. By way of example, an email address may be a specific type of external ID, whereas the external ID value may be, john.doe@email.com. Because the external ID is stored in association with a segment ID, the data that identifies each customer can be joined with the event data of the customer through common segment IDs.

Finally, because each customer may interact with different data sources at different times, the identity resolution system may assign two different segment IDs to the same customer. For instance, referring to the example presented in connection with FIG. 2, a first segment ID may be associated with the event data that derived via the website 202, whereas a second segment ID may be associated with the event data derived as a result of the same customer interacting with the mobile app 204. The identity resolution system analyzes each message received for external IDs, and then compares any newly received external IDs with known external IDs that area already associated with existing segment IDs. When a newly received external ID matches the value of an existing external ID, the two separate profiles are combined through an entry in a merge table. For example, a record is added to the merge table to indicate that two (or more) segment IDs are related, and thus, all of the event data and external ID data associated with the two (or more) segment IDs should be considered as being related to the same customer.

Consistent with embodiments of the present invention, a data warehouse connector is configured to process event data, after the event data has been processed by the identity resolution system, such that the data that is ultimately written to the data warehouse represents a full and complete view of each customer. Because the customer data in the merge table, the customer data in each event table, and the customer data in the identity table, can easily be joined by common segment IDs, the customer data that is written to the data warehouse can easily be queried to provide a complete view of each customer. By using the system-generated segment ID to uniquely identify individual customers, and then ensuring that a segment ID is written to the data warehouse in association with the relevant customer data, the data that is written to the warehouse can easily be joined (e.g., by segment ID), thereby providing a complete view of customer data, for each customer. Other advantages of the present invention will be readily apparent from the description of the several figures that follows.

Figure 3:
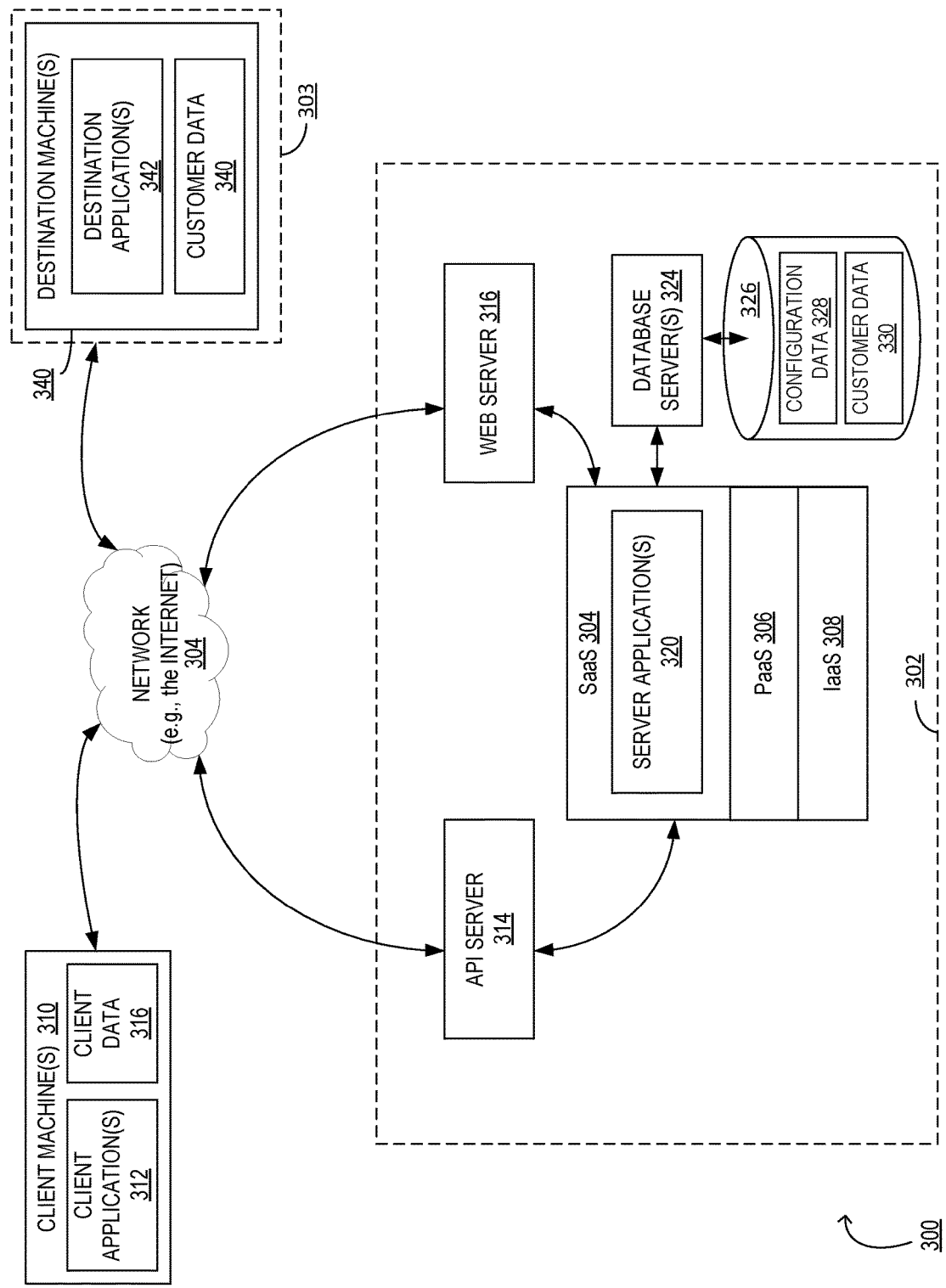
FIG. 3 is a system diagram illustrating the computing components of a customer data platform, consistent with embodiments of the present invention.

FIG. 3 is a network diagram depicting an example system 300 within which various example embodiments may be deployed. One or more client machine(s) 310 may be communicatively coupled (e.g., via one or more network(s) 304) to one or more networked systems, such as the customer data platform system 302 or networked system 303. Each of the one or more client machine(s) 310 may execute one or more client application(s) 312. Examples of client application(s) 312 include one or more applications that receive, store, and/or transmit customer data (e.g., information pertaining to identities of one or more users of the one or more client application(s) 312), as discussed in more detail below. In example embodiments, the client application(s) 312 may allocate or deallocate memory for client data 316 corresponding to events detected on the device, processing resources for processing or analyzing the data pertaining to the events, and communication resources (e.g., bandwidth) for receiving or transmitting the client data 316. Consistent with some embodiments, the client data 316 may include data used to identify an end-user of a client application 312 and client machine 310. Other examples of client application(s) 312 may include a web browser application, such as the Internet Explorer browser developed by Microsoft Corporation of Redmond, Washington or other applications supported natively by an operating system of the machine 310, such as applications supported by Windows, iOS or Android operating systems. Each of the client application(s) 312 may include one or more software application modules (e.g., a plug-in, add-in, or similar) that adds a specific service, function, or feature to the client application 312.

One or more of networked systems 302 or 303 may be implemented with or take the example form of a cloud computing service, such as Amazon Web Services (AWS), Microsoft Azure, or other cloud service and may provide server-side functionality, via a network 304 (e.g., the Internet or another Wide Area Network (WAN)) to one or more endpoints (e.g., client machines 310). FIG. 3 illustrates client application(s) 312 on the client machines 310. Consistent with some embodiments, the networked system 303 may include one or more destination machine(s) 340. The one or more destination machine(s) 340 may execute one or more destination application(s) 342 that are configured to, for example, receive and analyze customer data, including event data, created at and received (indirectly) from the one or more client machine(s) 310. Similarly, the one or more destination machines(s) 340 may communicate results of customer data analysis to the one or more client application(s) 312 or the one or more server application(s) 320. Consistent with some embodiments, the one or more destination machine(s) 340 may be configured to receive customer data that is generated at the client application(s) 312, as described in more detail below. Examples of the destination application(s) 342 may include any of a wide variety of applications that provide an enterprise to engage with its customers. For example, the destination applications 342 may include one or more applications that receive and analyze customer data for purposes of facilitating the planning and executing of advertising campaigns, email marketing campaigns, and similar customer engagement campaigns. With some embodiments, one or more destination applications may receive and analyze customer data for purposes of generating push notifications that are communicated to a specific client application 312 executing on a mobile computing device (e.g., a mobile client machine 310). In other instances, the destination application 342 may facilitate customer analytics and reporting.

Consistent with some embodiments, the networked system 302 will receive customer-related event data from a variety of client machines 310. The event data is processed by an identify resolution system (not shown in FIG. 3) to ensure that the event data is associated with one or more identifiers that are in turn associated with a unique customer profile, and then store the customer data 330 in a database for subsequent retrieval and analysis. In addition, a data warehouse connector may further process the data that is generated and output by the identify resolution system, in order to communicated the customer profile data to an external, cloud-based data warehouse, where the customer data can be further processed. Further details of the identify resolution system and the data warehouse connector are set forth below in connection with the descriptions of FIGS. 4 and 5.

Consistent with some embodiments, the networked system 302 includes one or more server application(s) 320 that are configured to, for example, receive communications—specifically event data that includes or pertains to customers—from the one or more client application(s) 312 or the one or more destination application(s) 342. These communications may be received from the one or more client application(s) 312 and may include data useful for identifying types of computing devices (e.g., specific types or characteristics of client machine(s) 310), such as operating systems deployed and features supported by the one or more client machine(s) 310, computing resources available to the one or more client machine(s) 310, and/or data pertaining to the identities of the one or more users of the client machine(s) 310. Communications may also include event data pertaining to events detected on the client machine(s) 310, where such events are the results of users interacting with one or more client application(s) 312. This information may then be processed and used by the server application(s) 320 to, for example, create, update, or remove data items stored in configuration data 328 and profile data 330.

As described below, the event data received from the client machines 310 may include customer data, which is processed by an identity resolution system (not shown in FIG. 3), before being stored as customer data 330, and/or directed to a data warehouse connector for forwarding to a cloud-based data warehouse. The configuration data may include rules included in one or more plug-ins that are installed on the one or more client machine(s) 310 (e.g., for filtering, merging, and/or unmerging of customer profile data), before sending of the customer profile data to a destination machine(s) 340.

Communications received from the destination application(s) 342 may include information included in the client data 316 from which one or more customer profiles may be processed or generated. This processing may include merging customer profiles or unmerging customer profiles based on relationships determined to exist through analysis of identifiers included with the event data received from various client machines 310.

The one or more server application(s) 320 may perform one or more operations to, for example, configure the one or more client application(s) 312 or the one or more destination application(s) 342. For example, the one or more server application(s) 320 may select one or more plug-ins (e.g., from configuration data 328) for deployment to the one or more client machine(s) 310 (e.g., based on the identified types of the one or more client machine(s) 310). Consistent with some embodiments, the one or more server application(s) 320 may customize instructions included in the plug-ins based on the one or more communications received from the client machine(s) 310 or the destination machine(s) 340 (e.g., based on information pertaining to the efficiency with which data or events are being processed on the client machines, based on the types of output that the one or more server applications 320 desire to receive from the destination applications 342, and/or based on one or more rules related to identity data, such as rules governing the merging or unmerging of customer profiles from which the event data is generated, merge protection rules, graph processing rules, or identity resolution rules.

Each of networked systems 302 and 303 may include an Application Programming Interface (API) server (e.g., API server 314) or a web server (e.g., web server 316), which may be programmatically coupled to, and provide programmatic and web interfaces respectively to, one or more software services, which may be hosted on a software-as-a-service (SaaS) layer or platform (e.g., SaaS platform 304). The SaaS platform 304 may be part of a service-oriented architecture, being stacked upon a platform-as-a-service (PaaS) layer (e.g., PaaS layer 306) which, may be, in turn, stacked upon an infrastructure-as-a-service (IaaS) layer (e.g., IaaS layer 308) (e.g., in accordance with standards defined by the National Institute of Standards and Technology (NIST)).

While the server applications 320 are shown in FIG. 3 to form part of the networked system 302, in alternative embodiments, the server applications 320 may be, or form part of, a data service that is separate and distinct from the networked system 302. Further, while the system 300 shown in FIG. 3 employs a cloud-based architecture, various embodiments are, of course, not limited to such an architecture, and could equally well find application in a client-server, distributed, or peer-to-peer system, for example. The various server applications 320 could also be implemented as standalone software programs.

One or more of the client applications 312 executing on the client machine(s) 310 may access the various server applications 320 or destination applications 342 (e.g., via an interface supported by a server, such as web server, or an API supported by an API server, such as API server 314). For example, third-party applications executing on the client machine(s) 310 may access one or more features or functions on a website hosted by the third party, such as those provided by destination application(s) 342 or server application(s) 320 using interfaces or APIs.

The server applications 320 or destination applications 342 may be hosted on dedicated or shared server machines (not shown) that are communicatively coupled to enable communications between server machines. The server applications 320 or destination application(s) 342 themselves may be communicatively coupled (e.g., via appropriate interfaces) to each other and to various data sources, so as to allow information to be passed between the server applications 320 and destination application(s) 342 and so as to allow the server applications 320 and destination application(s) 342 to share and access common data. The server applications 320 or destination application(s) 342 may furthermore access one or more databases (e.g., database(s) 326) via one or more database servers (e.g., database server(s) 324). In various example embodiments, various data items are stored in the database(s), such as configuration data 328 and customer data 330.

Figure 4:
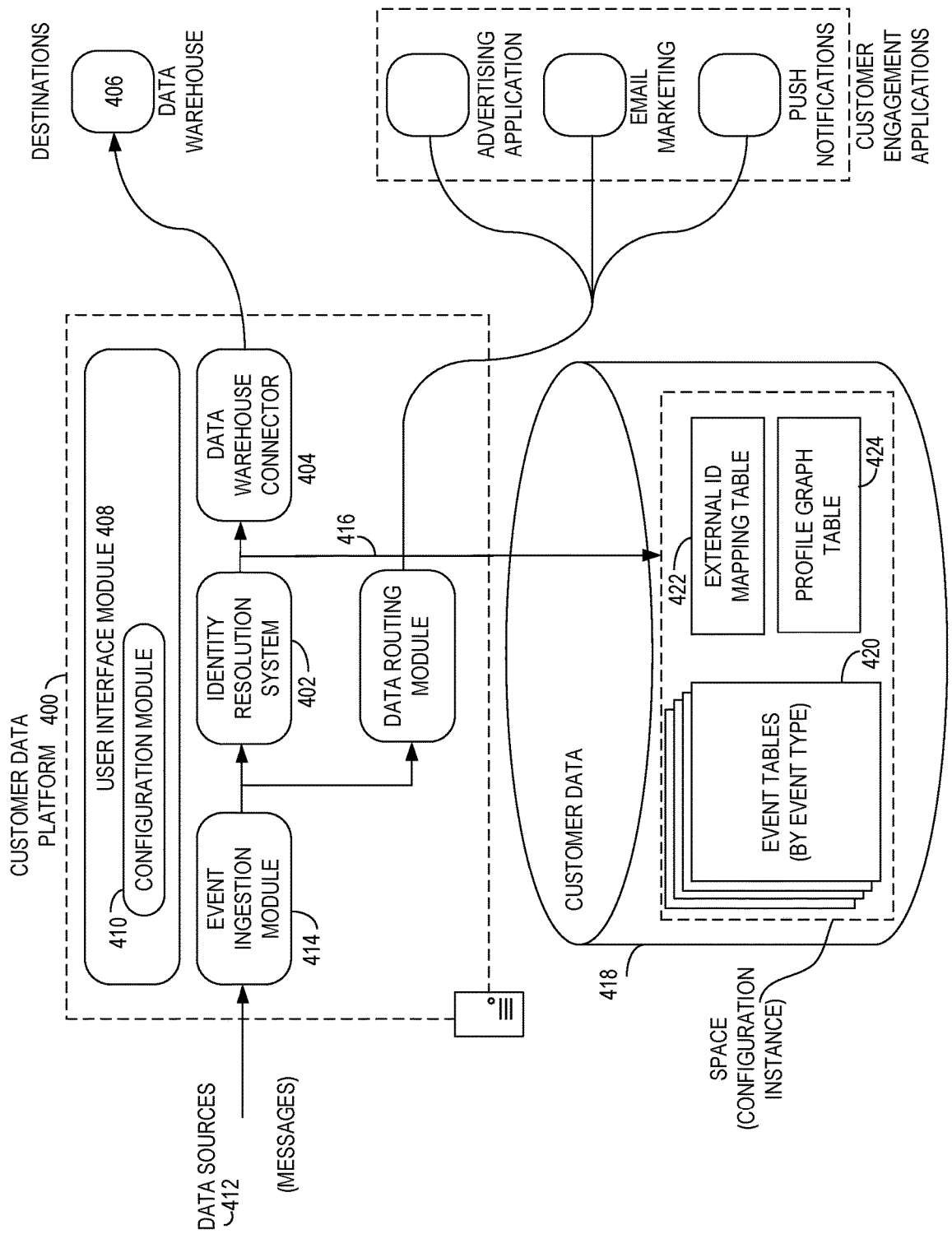
FIG. 4 is a diagram illustrating an example of a customer data platform that has an identity resolution system for resolving the identity of customer profile data, and a data warehouse connector for writing identity-resolved customer profile data to a cloud-based data warehouse, consistent with embodiments of the present invention.

FIG. 4 is a diagram illustrating an example of a customer data platform 400 that has an identity resolution system 402 for resolving the identity of customer profile data, and a data warehouse connector 404 for writing identity-resolved customer profile data to a cloud-based data warehouse 406, consistent with embodiments of the present invention. As illustrated in FIG. 4, the customer data platform 400 includes a user interface module 402. In general, the user interface module 402 provides an end-user of the customer data platform 400 with various user interfaces for establishing configuration settings, monitoring the state of various operations and tasks, and so forth. For instance, in addition to configuring the customer data platform 400 to receive messages from various data sources, and to forward data to various applications, an end-user may configure a data warehouse connector 404 for use with one of several cloud-based data warehouse services 406. Some examples of cloud-based data warehouses include, but are certainly not limited to: Snowflake, Google BigQuery, Amazon Redshift, and Postgres.

With some embodiments, the user interface module provides one or more user interfaces for accessing a configuration module 406, via which various configuration settings can be established. In addition, the user interface module may provide access to user interfaces (e.g., a dashboard) that provides operational status information relating to the data warehouse connector 404. With respect to the configuration settings for the data warehouse connector 404, the configuration module 406 generally provides the end-user with the ability to configure data warehouse connection settings, for example, configuration data that facilitates the connection and exchange of data between the data warehouse connector 402 and the data warehouse service 406. In addition, the configuration settings accessible to the end-user may involve configuration settings for establishing a synchronization schedule, and selective synchronization operations.

Consistent with some embodiments, the configuration of the data warehouse connector 404 is done for a single configuration instance, referred to herein as a space. By way of example, a space is essentially a single instance of the various tables and configuration settings for the customer data platform service. A single organization that is utilizing the customer data platform may establish separate spaces, for example, to coincide with different divisions of a business organization, or perhaps different spaces for each of several geographical regions. In any case, the tables that are loaded into the data warehouse are generated in the context of a space. This implies data from multiple data sources, that are a part the same space, will be loaded in the same schema in the data warehouse.

Consistent with some embodiments, through the configuration module 410, an end-user of the customer data platform 400 may configure a synchronization schedule or sync schedule that will determine the frequency with which customer data is written to the data warehouse, and thus impact the "freshness" of the data in the data warehouse. For example, with some embodiments, the sync schedule may be set to sync customer profile data on an hourly basis, at one or more specific times during each day (e.g., 8:00 AM; 9:00 AM and 9:00 PM, etc.), or based on some time interval (e.g., every 15 minutes).

In addition to facilitating the establishment of configuration settings for a sync schedule, the user interface module 408 may also provide a user interface, such as a dashboard or similar page, that provides status information relating to each data warehouse synchronization operation that is invoked. By way of example, a synchronization status page may allow an end-user to view the status of the most recent data warehouse synchronization operation, including the current phase of the operation, the duration of the operation, and the number of rows of data that have been successfully synchronized. If the end-user is associated with or managing multiple spaces (e.g., individual configuration instances of the CDP), then the information relating to the synchronization history may be viewable by space. A synchronization history page may, for example, display information relating to the duration of the most recent synchronization operation. In addition, the status of the most recently completed synchronization operation may be displayed—for example, whether the synchronization operation succeeded, partially succeeded, or failed. In addition, the history page may show the number of rows that were successfully, or partially successfully, synchronized on a per table basis. Finally, if any errors occurred in the synchronization operation, information about the errors, and the particular tables in the data warehouse that were impacted, may be displayed.

With some embodiments, end-users of the customer data platform may configure settings for receiving notifications relating to the operation of the data warehouse connector 404. For example, an end-user may configure settings in order to receive notifications about the status of a sync. In some instances, the end-user may be able to select which types of notifications to receive, and via which channels. For example, a notification may be sent when a sync operation is initiated, when a sync operation completes successfully, when a sync operations fails. In the case when a sync operation fails, the notification will including information about any error that may have occurred causing the syn operation to fail. An end-user may elect to receive notifications via any of a number of channels, such as email notifications, mobile app notification, webhooks, Slack integrations, and others.

With some embodiments, when an end-user initially configures the data warehouse connector 404 to connect with a data warehouse 406, a backfill operation will automatically be initiated to synchronize customer profile data from some prior duration of time (e.g., prior two months). In some instances, when configuring a data warehouse connection, an end-user may indicate a specific duration of time for performing a backfill operation.

Once the data warehouse connector 404 and the identity resolution system 402 have been configured, as customers interact with various data sources (e.g., touchpoints), the interactions by the customers cause messages to be generated and communicated over a computer network to the customer data platform 400. These messages with event data are received and processed by an event ingestion module 414. The event ingestion module 414 processes each message to verify that the format of the message is proper. The event ingestion module 414 will then forward the messages to the identity resolution system 402.

An example of an identity resolution system and the complete details on how it operates are described in U.S. application Ser. No. 17/664,028, having the title, ("Identity Resolution System"), which is hereby incorporated herein by reference. The identity resolution system 402 builds a customer profile that represents a single end user of a customer. Internally, the identity resolution system 402 maintains an identity graph that is updated each time an event results in a customer profile change. Here, a customer profile change includes the addition of new external identifiers. For example, if a customer registers at a website and provides an email address, this interaction may result in a message with event data that included the external ID (e.g., email address) for the customer. This new external ID, when received and processed by the identity resolution system 402, will be added to the customer profile. Additionally, when the identify resolution system 402 makes a determination that two customer profiles have been created for the same customer, the identify resolution system will update the customer profile by adding a record in a merge table, where the record associated the two segment IDs that correspond with the two customer profiles. Once merged, the two customer profiles can be considered as one. The output of the identity resolution system 402 is an identity-resolved event along with any changes to a customer profile that may have resulted.

As shown in FIG. 4 by the connecting line with reference number 416, the output of the identity resolution system 402 may be stored in a local database 418, with tables associated with the specific space that has been configured. Furthermore, as discussed in greater detail below, the output of the identify resolution system 402 is provided as input to the data warehouse connector 404. For instance, the data warehouse connector 404 consumes the output from the identity resolution system 402 and loads it into the necessary tables in the end-user-managed data warehouse 406. These include tables that generally correspond with those shown in the local database 418. Specifically, these tables include event tables 420—where there is one event table for each event type. These event tables 420 store the raw identity resolved event data. Accordingly, each row in an event table includes the event data for the event type, and a system-generated segment ID that associates the event data with a customer profile. The tables also include an external ID mapping table 422 that associates each external ID with a segment ID. For example, for each segment ID representing a unique customer profile, a row in the external ID mapping table 422 will include the segment ID and an external ID, where the external ID is some value (e.g., an email address) that can be used to characterize or identify the customer (associated with the segment ID) and/or a computing device of the customer. Finally, the tables include a profile graph or profile merge table 424. The profile graph table 424 stores data indicating which segment IDs are associated with one another by virtue of sharing one or more external IDs, and thus represent the same customer. For instance, when customer data for the same customer is obtained at two different times, from two different sources, it may be the case that two segment IDs are assigned to the two separate streams of event data. The identity resolution system 402 will analyze external IDs to determine when two segment IDs are referencing the same customer, and create a row in the profile graph table 424 to merge the segment IDs into a single customer profile.

Figure 5:
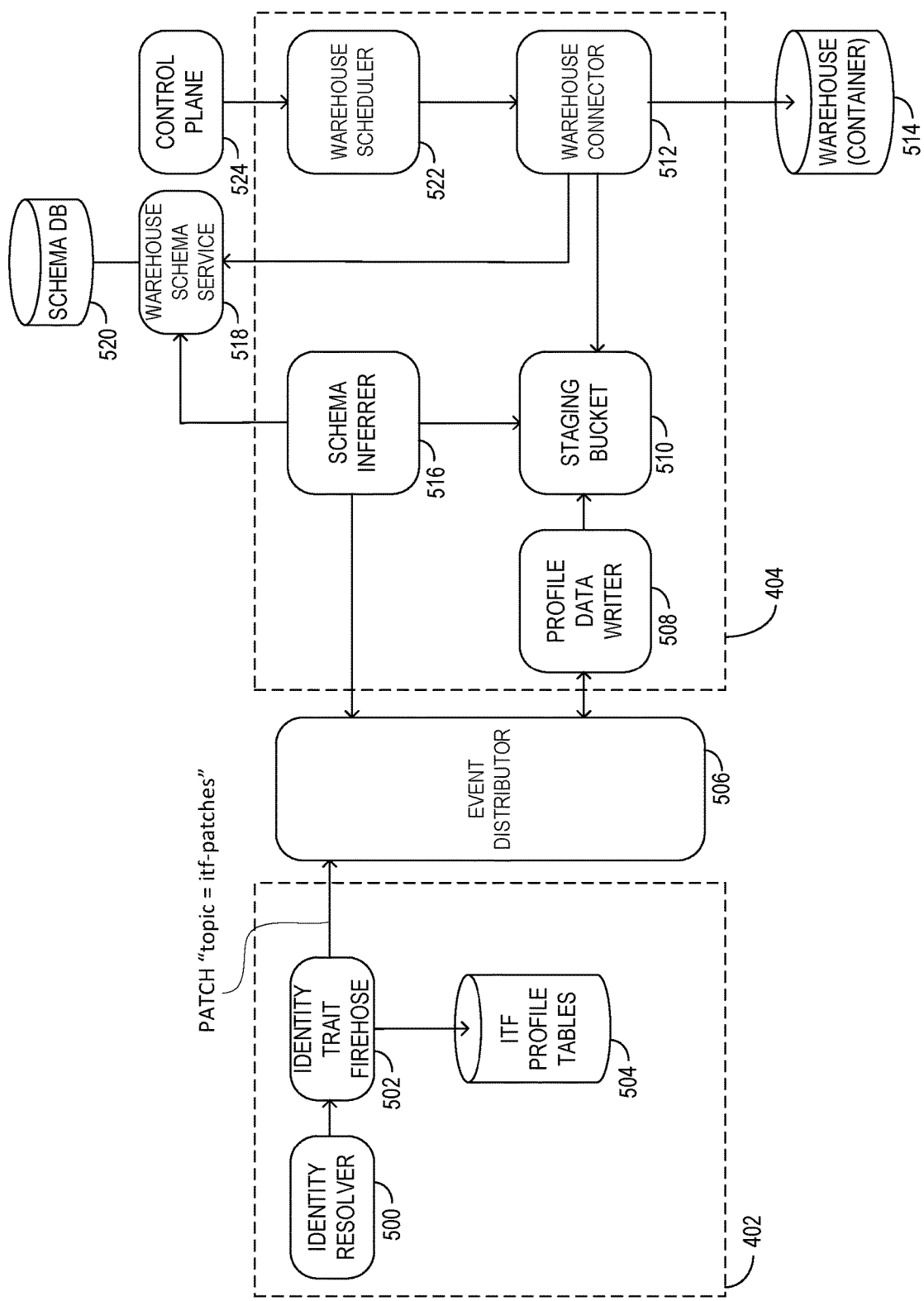
FIG. 5 is a functional diagram illustrating the component parts, and integration of, an identity resolution system with a data warehouse connector, consistent with embodiments of the present invention.
Figure 6:
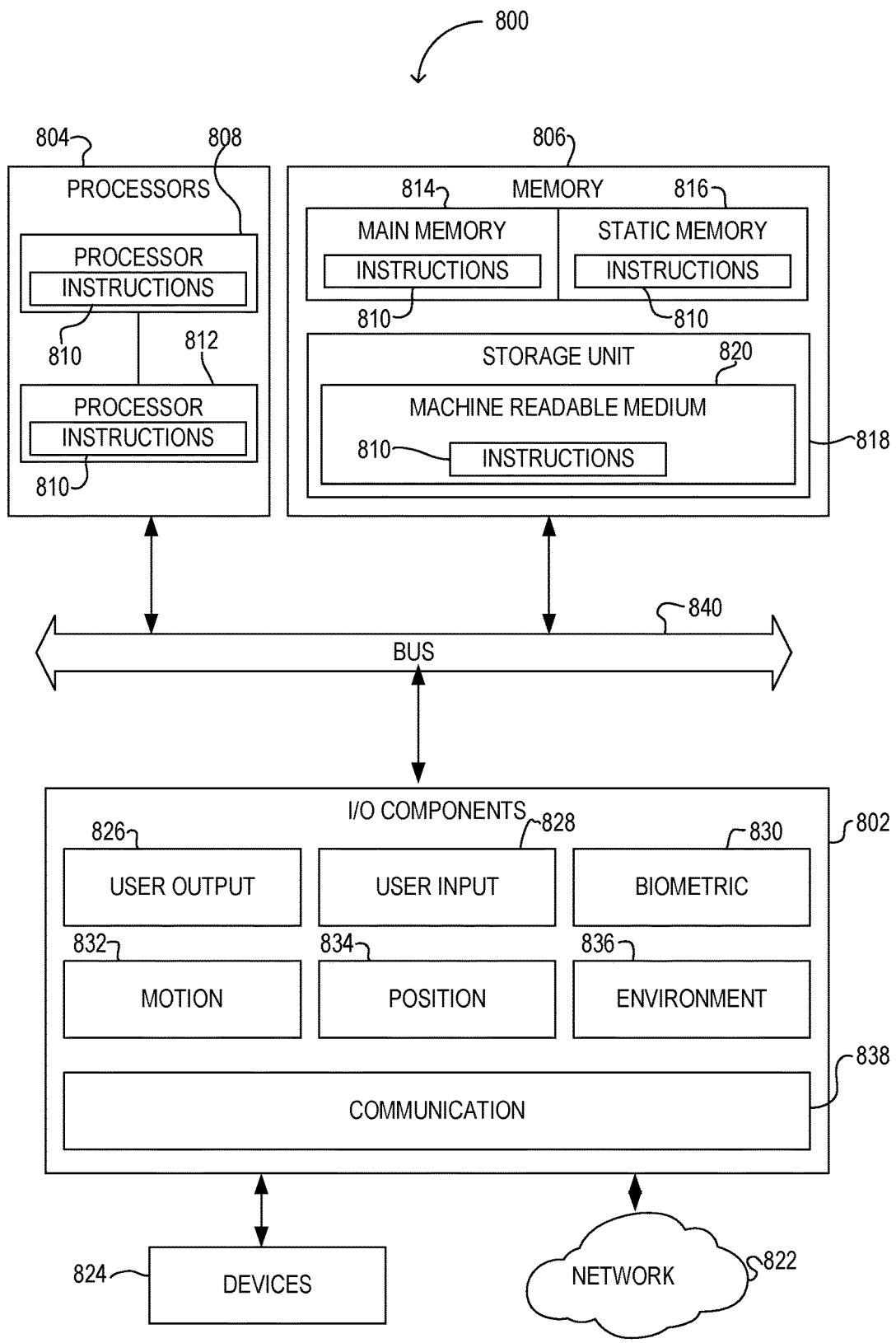
FIG. 6 is a diagrammatic representation of a computing device (e.g., a machine) within which instructions for causing the computing device to perform any one or more of the methodologies discussed herein may be stored and executed.

FIG. 5 is a functional diagram illustrating an architectural view including the component parts, and integration of, an identity resolution system 402 with a data warehouse connector, consistent with embodiments of the present invention. In the example architecture presented in FIG. 5, the bounding boxes 402 and 404 correspond with the identity resolution system 402 and data warehouse connector 404, as shown in FIG. 4. The identity resolver 500 is the component part of the identity resolution system 402 that outputs the identity-resolved events, and when processing of an event causes an update to a customer profile, the data reflecting the customer profile changes.

The data that is output by the identity resolver 500 is read by the identity trait firehose 502. The identity trait firehose 502 maintains an internal database 504 that stores the state of each customer profile at a given point in time. Upon receiving an identity-resolved message from the identify resolver 500, the identity trait firehose 502 updates the state of the profile as stored in the database 504 and transmits a patch that contains information relating to the customer profile updates. The identity trait firehose generates output in the protocol buffer format, commonly referred to as Protobuf—an open source, binary format created to serialize data between different services. The data that is included in the patches generated by the identity trait firehose includes identity-resolved event data, any new external IDs, new traits, and information relating to any profile merges that resulted from the identity resolver 500 processing a message. For example, a profile merge occurs when the identity resolution system 402 updates the profile graph table 424 with a data record indicating that two segment IDs are in fact associated with the same customer. When a new customer profile merge occurs as the result of the identity resolution system processing an event, all of the merged segment ID information in a chain of segment IDs is included in the patch. By way of example, consider a scenario in which the identity resolution system 402 has previously merged three segment IDs (e.g., seg1→seg2→seg3). If, in processing a new event, the identity resolution system 402 determines that a fourth segment ID (e.g., seg4) is associated with the same customer profile as the three previously merged segment IDs, then the patch that is output by the identity trait firehose 505 will include all four segment IDs (e.g., seg1→seg2→seg3→seg4). The patch will also include data relating to the original message or event that resulted in any customer profile change, as well as data for the resulting customer profile. If a message processed by the identity resolver 500 does not change the state of a customer profile, then the patch created by the identity fire hose 502 will only contain the original event data and the associated customer profile.

Once the patch has been generated by the identity trait firehose 502, the patch is tagged with a topic and sent to an event distributor 506. The event distributor 506 may be a distributed publish-subscribe message service, such as Kafka. The topic (e.g., topic="itf-patches") identifies the source and subject of the patch, such that, when the event distributor 506 publishes the patch, any subscribers to the topic with which the patch has been tagged are notified when the message is published. This serves as a triggering event for a subscriber to process the data in the message.

The data warehouse connector service 404 includes a profile data writer 508. The profile data writer 508 subscribes to receive messages (e.g., patches) that are published by the event distributor 506 with the topic used by the identity trait firehose (e.g., topic="itf-patches"). Accordingly, when a patch with the topic, "itf-patches," is published by the event distributor 506, the profile data writer 508 of the data warehouse service 404 will process the patch by reading the data in the patch, translating the Protbuf formatted data to the JSON (JavaScript Object Notation) format, compressing the data, and then writing the data to a cloud-based staging bucket 510. With some embodiments, a cloud-based storage service, such as Amazon S3, may be used. Amazon S3 is an object storage service that stores data as objects within staging buckets. In this case, the staging bucket 510 serves as the temporary storage space before aggregated patch data can be loaded into the data warehouse container 514 by the warehouse connector 512. When the profile data writer 508 is writing data from a patch to the staging bucket 510, the name of the space (e.g., the CDP configuration instance) or space ID, and a date and current time, timestamp, are written to the staging bucket 510. Consequently, when the warehouse connector 512 is loading data into the warehouse container 514, the objects in the staging bucket 510 can be selectively read by space ID and time. When the profile data writer 508 executes an operation to write customer data to the staging bucket, the profile data writer 508 also publishes a message to the event distributor 506 under the topic, "profile-notification." As described below, the message published to the event distributor 506 will be ready by the subscribing service referred to in FIG. 5 as the schema inferrer 516.

This portion of the data processing pipeline of the data warehouse connector 404 is intentionally simple and does not do any major processing of the events. Instead, patches are simply read, by the profile data writer 508, from the event distributor 506, and written to the staging bucket 510 every few minutes. These low-latency writes to the storage bucket 510 will allow for fast loading of data to the warehouse container 514. As described in greater detail below, the warehouse connector 512 that reads the customer profile data from the staging bucket 510 is responsible for the more complex data processing, and makes the event data suitable for loading into the warehouse container 514.

The schema inferrer 516 is a subscriber to the event distributor, and specifically, for the topic "profile-notification." Accordingly, when the profile data writer 508 publishes a message to the event distributor 506 with the topic, "profile-notification," the schema inferrer reads the message, and then in response, reads event data from the staging bucket 510 with the objective of updating the schema used in the data warehouse for receiving the customer profile data, and more specifically the event data. The schema of the identity-resolved events is not fixed as these events—specifically, the properties—can be customed by the end-user. End-users may, at any point, create customer events, such that some data sources may send messages with new events and/or new properties within the event data. When an end-user creates a new event, this results in a new table in the data warehouse corresponding to the event type. Similarly, when an event type is customized to include new properties, this results in new columns for existing event type tables. It is the task of the schema inferrer to read the event data from the staging bucket 510 to analyze the event data to infer new events, and new properties for existing events. Inferring the schema of these events enables the warehouse connector 512 to make updates to the configuration of the tables in the data warehouse 514.

The warehouse schema service 518 exposes an API to manage updates to schemas stored in the schema database 520. With some embodiments, the warehouse schema service 518 may be implemented as a JSON RPC (remote procedure call) service. The schema database stores the schemas that are deployed in the data warehouse 514. The schema database also stores the per-warehouse schema settings that are mostly configured via a user interface that facilitates the configuration of the selecting synchronization operations.

The warehouse scheduler 522 receives configuration settings for the data warehouse synchronization tasks from the control plane 524. Accordingly, the warehouse scheduler service schedules a warehouse sync operation based on the configuration settings that have been established by the end-user. A data warehouse sync operation starts a separate sync for each combination of a space and data warehouse. The warehouse scheduler 522 tracks a sync operation until it completes and ensures that the status of the syn operation is updated for reporting purposes. For instance, data relating to the status of a sync operation is used to update the sync-status and the sync history pages in the user interface for the CDP.

The function of the warehouse connector 512 is to read the customer profile data from the staging bucket 510 and write the customer profile data to the appropriate tables of the data warehouse 514. With some embodiments, the warehouse connector 512 operates in four distinct phases. During a first phase, referred to as a scan or scanning phase, the warehouse connector 512 accesses the staging bucket 510 to identify and group multiple customer profile data files stored at the staging bucket 510, which contain the customer profile data that needs syncing to the data warehouse 514. During the scanning phase, the warehouse connector 512 will identify the files to be synced based on a last checkpoint and then group the files based on their size. Next, during a download phase, the warehouse connector 512 parses the customer profile data within each file, and transforms the profile data into objects for the data warehouse 514. The transformed data warehouse objects are temporarily stored at the staging bucket 510. Next, during a warehouse processing phase, the warehouse connector 512 performs various operations to validate that the data objects written to the staging bucket 510 in the previous phase are consistent with the schema of the data warehouse, as written to the schema database 510. Finally, once the customer profile data has been validated, during a warehouse download phase, the warehouse connector 514 updates the tables in the data warehouse to reflect any changes in the schema, and then reads the validated data warehouse data objects from the staging bucket, and writes the data to the appriorate tables in the data warehouse 514. The warehouse connector 512 then reports to the warehouse scheduler 522 any performance metrics—such as the status of the operation to update the data warehouse 514, as well as the duration of the operation for updating the data warehouse, and any information on errors, if errors occur.

With the customer profile data successfully written to the various tables of the data warehouse 514, an end-user can generate queries against the customer profile data. Because the customer profile data has been generated subsequent to being processed by the identity resolution system, the customer profile data represents a complete view of an individual customer. This is optimal for performing various business intelligence analytics and reporting.

Machine Architecture

Figure 7:
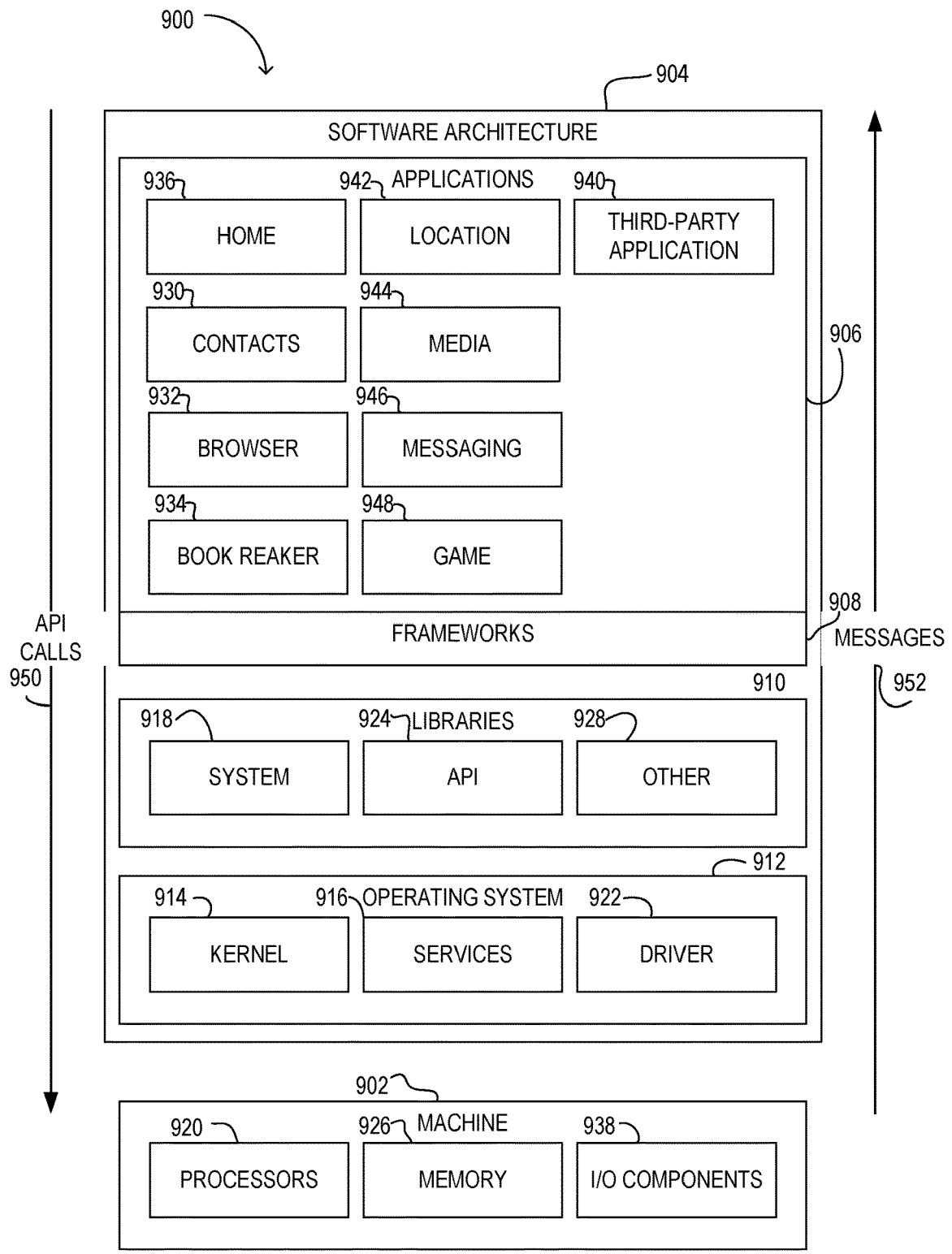
FIG. 7 is a block diagram illustrating a software architecture, which can be installed on any one or more of the devices described herein.

FIG. 7 is a diagrammatic representation of a machine 800—sometimes referred to as a computing device—within which instructions 810 (e.g., software, a program, an application or app, or other executable code) for causing the machine 800 to perform any one or more of the methodologies discussed herein may be executed. For example, the instructions 810 may cause the machine 800 to execute any one or more of the methods described herein. The instructions 810 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine (e.g., client computing device) in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while a single machine 800 is illustrated, the term "machine" shall also be taken to include a collection of machines that individually or jointly execute the instructions 810 to perform any one or more of the methodologies discussed herein. The machine 800, for example, may comprise the client machine(s) 310 or any one of multiple server devices forming part of the customer data platform 300. In some examples, the machine 800 may also comprise both client and server systems, with certain operations of a particular method or algorithm being performed on the server-side and with certain operations of the particular method or algorithm being performed on the client-side.

The machine 800 may include processors 804, memory 806, and input/output I/O components 802, which may be configured to communicate with each other via a bus 840. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 808 and a processor 812 that execute the instructions 810. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single-core, a single processor with multiple cores (e.g., a multi-core processor), multiple processors with a single core, multiple processors with multiples cores, or any combination thereof.

The memory 806 includes a main memory 814, a static memory 816, and a storage unit 818, all accessible to the processors 804 via the bus 840. The main memory 806, the static memory 816, and storage unit 818 store the instructions 810 embodying any one or more of the methodologies or functions described herein. The instructions 810 may also reside, completely or partially, within the main memory 814, within the static memory 816, within machine-readable medium 820 within the storage unit 818, within at least one of the processors 804 (e.g., within the processor's cache memory), or any suitable combination thereof, during execution thereof by the machine 800.

The I/O components 802 may include a wide variety of components to receive input, provide output, produce output, transmit information, exchange information, capture measurements, and so on. The specific I/O components 802 that are included in a particular machine will depend on the type of machine. For example, portable machines such as mobile phones may include a touch input device or other such input mechanisms, while a headless server machine will likely not include such a touch input device. It will be appreciated that the I/O components 802 may include many other components that are not shown in FIG. 8. In various examples, the I/O components 802 may include user output components 826 and user input components 828. The user output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 802 may include biometric components 830, motion components 832, environmental components 836, or position components 834, among a wide array of other components. For example, the biometric components 830 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 832 include acceleration sensor components (e.g., accelerometer), gravitation sensor components, rotation sensor components (e.g., gyroscope).

The environmental components 836 include, for example, one or more image sensors or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 834 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 802 further include communication components 838 operable to couple the machine 800 to a network 822 or devices 824 via respective coupling or connections. For example, the communication components 838 may include a network interface component or another suitable device to interface with the network 822. In further examples, the communication components 838 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 824 may be another machine or any of a wide variety of peripheral devices (e.g., a peripheral device coupled via a USB).

Moreover, the communication components 838 may detect identifiers or include components operable to detect identifiers. For example, the communication components 838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 838, such as location via Internet Protocol (IP) geolocation, location via Wi-Fi® signal triangulation, location via detecting an NFC beacon signal that may indicate a particular location, and so forth.

The various memories (e.g., main memory 814, static memory 816, and memory of the processors 804) and storage unit 818 may store one or more sets of instructions and data structures (e.g., software) embodying or used by any one or more of the methodologies or functions described herein. These instructions (e.g., the instructions 810), when executed by processors 804, cause various operations to implement the disclosed examples.

The instructions 810 may be transmitted or received over the network 822, using a transmission medium, via a network interface device (e.g., a network interface component included in the communication components 838) and using any one of several well-known transfer protocols (e.g., hypertext transfer protocol (HTTP)). Similarly, the instructions 810 may be transmitted or received using a transmission medium via a coupling (e.g., a peer-to-peer coupling) to the devices 824.

Software Architecture FIG. 8 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionalities. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., USB drivers), WI-FED drivers, audio drivers, power management drivers, and so forth.

The libraries 910 provide a common low-level infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a common high-level infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example, the applications 906 may include a home application 936, a contacts application 930, a browser application 932, a book reader application 934, a location application 942, a media application 944, a messaging application 946, a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 950 provided by the operating system 912 to facilitate functionalities described herein.

We claim:
1. A system comprising:
one or more computer processors for executing instructions;
one or more memory storage devices, storing instructions thereon, which, when executed by the one or more computer processors, cause the system to perform operations comprising:
processing received data to generate identity-resolved customer profile data, wherein the received data comprises event data and customer identifier data, and the identity-resolved customer profile data comprises i) event data and identifier data to which a system-generated identifier has been assigned, each system-generated identifier representing a customer, and ii) a directed graph indicating when two or more system-generated identifiers represent the same customer; and
processing the identity-resolved customer profile data by:
analyzing the event data to determine a schema for at least one instance of the event data by extracting key attributes from the event data, determining data types for each attribute, and identifying relationships among the attributes based on predefined rules;
storing the determined schema and per-warehouse schema settings in a schema database:
adding a table in a data warehouse to reflect the schema for the at least one instance of the event data by configuring the table with columns corresponding to the key attributes, setting data type constraints based on the determined data types, and establishing relational links among the columns based on the identified relationships; and
writing the identity-resolved customer profile data, including the at least one instance of the event data, to tables of the data warehouse based on the schema stored in the schema database;
wherein the identity-resolved customer profile data is written to and stored at a cloud-based staging bucket, prior to the customer profile data being written to the data warehouse during a scheduled data warehouse synchronization operation.

2. The system of claim 1, wherein writing the identity-resolved customer profile data to tables of the data warehouse comprises:
writing identity-resolved event data to one of a plurality of event tables, where each event table is for events of a specific event type; and writing identity-resolved identifier data to an identity table.

3. The system of claim 1, wherein writing the identity-resolved customer profile data to tables of the data warehouse comprises:
writing data to a profile graph table of the data warehouse to reflect that two or more system-generated identifiers represent the same customer.

4. The system of claim 1, wherein the received data is received via messages communicated over a network to the system via one or more data sources that an end-user of the system has configured via a user interface of the system.

5. The system of claim 1, wherein writing the identity-resolved customer profile data to tables of the data warehouse further comprises:
writing the identity-resolved customer profile data to one of a plurality of cloud-based data warehouses for which a data warehouse connection service has been configured via a user interface of the system.

6. The system of claim 5, wherein the data warehouse connection is configurable to write the identity-resolved customer profile data to tables of the data warehouse on one of a plurality of synchronization schedules.

7. The system of claim 1, further comprising:
receiving status information relating to an operation to write the identity-resolved customer profile data to tables of the data warehouse, the status information including any one or more of:
information indicating state of the operation;
information indicating a number of rows of identity-resolved customer profile data written to a table of the data warehouse; or, information indicating a duration of time that has lapsed in executing the operation.

8. A computer-implemented method comprising: processing received data to generate identity-resolved customer profile data, wherein the received data comprises event data and customer identifier data, and the identity-resolved customer profile data comprises i) event data and identifier data to which a system-generated identifier has been assigned, each system-generated identifier representing a customer, and ii) a directed graph indicating when two or more system-generated identifiers represent the same customer; and
    processing the identity-resolved customer profile data by:
    analyzing the event data to determine a schema for at least one instance of the event data by extracting key attributes from the event data, determining data types for each attribute, and identifying relationships among the attributes based on predefined rules;
    storing the determined schema and per-warehouse schema settings in a schema database;
    adding a table in a data warehouse to reflect the schema for the at least one instance of the event data by configuring the table with columns corresponding to the key attributes, setting data type constraints based on the determined data types, and establishing relational links among the columns based on the identified relationships; and
    writing the identity-resolved customer profile data, including the at least one instance of the event data, to tables of the data warehouse based on the schema stored in the schema database; wherein the identity-resolved customer profile data is written to and stored at a cloud-based staging bucket, prior to the customer profile data being written to the data warehouse during a scheduled data warehouse synchronization operation.

9. The computer-implemented method of claim 8, wherein writing the identity-resolved customer profile data to tables of the data warehouse comprises: writing identity-resolved event data to one of a plurality of event tables, where each event table is for events of a specific event type; and writing identity-resolved identifier data to an identity table.

10. The computer-implemented method of claim 8, wherein writing the identity-resolved customer profile data to tables of the data warehouse comprises: writing data to a profile graph table of the data warehouse to reflect that two or more system-generated identifiers represent the same customer.

11. The computer-implemented method of claim 8, wherein the received data is received via messages communicated over a network to a system via one or more data sources that an end-user of the system has configured via a user interface of the system.

12. The computer-implemented method of claim 11, wherein writing the identity-resolved customer profile data to tables of the data warehouse further comprises: writing the identity-resolved customer profile data to one of a plurality of cloud-based data warehouses for which a data warehouse connection service has been configured via a user interface of the system.

13. The computer-implemented method of claim 12, wherein the data warehouse connection is configurable to write the identity-resolved customer profile data to tables of the data warehouse on one of a plurality of synchronization schedules.

14. The computer-implemented method of claim 8, further comprising:
receiving status information relating to an operation to write the identity-resolved customer profile data to tables of the data warehouse, the status information including any one or more of:
information indicating state of the operation;
information indicating a number of rows of identity-resolved customer profile data written to a table of the data warehouse; or,
information indicating a duration of time that has lapsed in executing the operation.

15. A system comprising:
means for processing received data to generate identity-resolved customer profile data,
wherein the received data comprises event data and customer identifier data, and the identity-resolved customer profile data comprises i) event data and identifier data to which a system-generated identifier has been assigned, each system-generated identifier representing a customer, and ii) a directed graph indicating when two or more system-generated identifiers represent the same customer; and
means for processing the identity-resolved customer profile data by:
analyzing the event data to determine a schema for at least one instance of the event data by extracting key attributes from the event data, determining data types for each attribute, and identifying relationships among the attributes based on predefined rules;
storing the determined schema and per-warehouse schema settings in a schema database;
adding a table in a data warehouse to reflect the schema for the at least one instance of the event data warehouse by configuring the table with columns corresponding to the key attributes, setting data type constraints based on the determined data types, and establishing relational links among the columns based on the identified relationships; and
writing the identity-resolved customer profile data, including the at least one instance of the event data, to tables of the data warehouse based on the schema stored in the schema database;
wherein the identity-resolved customer profile data is written to and stored at a cloud-based staging bucket, prior to the customer profile data being written to the data warehouse during a scheduled data warehouse synchronization operation.

16. The system of claim 15, wherein writing the identity-resolved customer profile data to tables of the data warehouse comprises:
writing identity-resolved event data to one of a plurality of event tables, where each event table is for events of a specific event type; and
writing identity-resolved identifier data to an identity table.

17. The system of claim 15, wherein writing the identity-resolved customer profile data to tables of the data warehouse comprises:

writing data to a profile graph table of the data warehouse to reflect that two or more system-generated identifiers represent the same customer.

18. The system of claim 15, wherein the received data is received via messages communicated over a network to the system via one or more data sources that an end-user of the system has configured via a user interface of the system.

* * * * *